United States Patent
Kubelsky

(10) Patent No.: US 12,479,047 B2
(45) Date of Patent: Nov. 25, 2025

(54) FIXTURE TO SECURELY BOND TRANSDUCERS TO AN OPTICAL ELEMENT

(71) Applicant: Greg Kubelsky, Bellwood, IL (US)

(72) Inventor: Greg Kubelsky, Bellwood, IL (US)

(73) Assignee: IntraAction Inc, Bellwood, IL (US)

( * ) Notice: Subject to any disclaimer, the term of this patent is extended or adjusted under 35 U.S.C. 154(b) by 202 days.

(21) Appl. No.: 18/132,025

(22) Filed: Apr. 7, 2023

(65) Prior Publication Data

US 2024/0335908 A1  Oct. 10, 2024

Related U.S. Application Data

(63) Continuation of application No. 18/132,076, filed on Apr. 7, 2023, now abandoned, and a continuation of application No. 18/132,070, filed on Apr. 7, 2023, now Pat. No. 11,984,695, and a continuation of application No. 18/132,058, filed on Apr. 7, 2023, now Pat. No. 11,999,009, and a continuation of application No. 18/132,054, filed on Apr. 7, 2023, now Pat. No. 11,813,697, and a continuation of application No. 18/132,047, filed on Apr. 7, 2023, now Pat. No. 12,300,961, and a continuation of application No. 18/132,074, filed on Apr. 7, 2023, now Pat. No. 12,107,381, and a continuation of application No. 18/132,069, filed on Apr. 7, 2023, now Pat. No. 11,885,949, and a continuation of application No. 18/132,064, filed on Apr. 7, 2023, now Pat. No. 11,757,532, and a continuation of application No. 18/132,034, filed on Apr. 7, 2023, now Pat. No. 11,906,874.

(51) Int. Cl.

| | | |
|---|---|---|
| B23K 26/359 | (2014.01) | |
| B23K 26/082 | (2014.01) | |
| D06M 10/00 | (2006.01) | |
| G02F 1/11 | (2006.01) | |
| B23K 103/00 | (2006.01) | |

(52) U.S. Cl.
CPC .......... *B23K 26/359* (2015.10); *B23K 26/082* (2015.10); *D06M 10/005* (2013.01); *G02F 1/113* (2013.01); *B23K 2103/38* (2018.08)

(58) Field of Classification Search
CPC .... G02F 1/113; D06M 10/005; B23K 26/082; B23K 26/359
USPC ........................................................ 359/305
See application file for complete search history.

(56) References Cited

U.S. PATENT DOCUMENTS

| | | | | |
|---|---|---|---|---|
| 3,633,996 A | * | 1/1972 | Lean ......................... | G02F 1/33 359/305 |
| 3,944,335 A | * | 3/1976 | Saito ....................... | G02F 1/116 359/313 |

(Continued)

*Primary Examiner* — Jimmy Chou
(74) *Attorney, Agent, or Firm* — PatentPC; Bao Tran

(57) ABSTRACT

Systems and methods are disclosed for bonding a plurality of transducers to an optical element by placing each transducer on a moveable pedestal mounted on a piston; temporarily securing each transducer to the moveable pedestal; applying an epoxy to a plurality of steps on a deflector surface; placing the piston with the transducers over the plurality of steps; actuating the piston and moving each moveable pedestal to contact the transducer with the epoxy; releasing the transducer from the moveable pedestal; and curing the epoxy to secure the transducer to the steps.

9 Claims, 9 Drawing Sheets

(56) References Cited

U.S. PATENT DOCUMENTS

| | | | | |
|---|---|---|---|---|
| 4,336,982 A * | 6/1982 | Rector, Jr. | G02F 1/0305 | 359/305 |
| 4,339,821 A * | 7/1982 | Coppock | H01S 3/1109 | 372/18 |
| 5,103,073 A * | 4/1992 | Danilov | G02B 5/188 | 219/121.76 |
| 5,567,207 A * | 10/1996 | Lockman | D06M 10/005 | 8/115.52 |
| 6,013,895 A * | 1/2000 | Steadman | B23K 26/0846 | 219/121.7 |
| 6,294,755 B1 * | 9/2001 | Sawatzky | G05B 19/416 | 219/121.72 |
| 6,307,665 B1 * | 10/2001 | Kim | G02F 1/11 | 359/305 |
| 6,424,451 B1 * | 7/2002 | Chang | G02F 1/11 | 359/305 |
| 6,449,083 B1 * | 9/2002 | Nishiyama | G02F 1/11 | 359/305 |
| 6,528,758 B2 * | 3/2003 | Shaffer | D06Q 1/00 | 219/121.68 |
| 7,054,055 B2 * | 5/2006 | Shibuya | G02F 1/11 | 359/305 |
| 7,385,749 B2 * | 6/2008 | Pannell | H01S 3/117 | 372/4 |
| 7,518,779 B2 * | 4/2009 | Wasilousky | G02F 1/113 | 359/240 |
| 7,570,358 B2 * | 8/2009 | Den Boef | G01N 21/956 | 356/326 |
| 7,697,195 B2 * | 4/2010 | Hill | G03F 7/70775 | 359/305 |
| 8,540,612 B2 * | 9/2013 | Skopek | B31B 70/00 | 493/227 |
| 8,598,490 B2 * | 12/2013 | Hooper | B23K 26/705 | 219/121.77 |
| 8,848,281 B2 * | 9/2014 | Sakurai | G02F 1/3534 | 359/328 |
| 9,958,710 B1 * | 5/2018 | Morse | G02F 1/11 | |
| 2002/0191264 A1 * | 12/2002 | Vernackt | G02F 1/11 | 359/237 |
| 2007/0075063 A1 * | 4/2007 | Wilbanks | B23K 26/40 | 219/121.85 |
| 2009/0147344 A1 * | 6/2009 | Lovering | H01S 3/117 | 372/13 |
| 2010/0276405 A1 * | 11/2010 | Cho | B23K 26/0622 | 219/121.72 |
| 2010/0328759 A1 * | 12/2010 | Kirkby | G02F 1/332 | 359/310 |
| 2014/0168753 A1 * | 6/2014 | Seyfried | G02F 1/33 | 359/305 |
| 2015/0014286 A1 * | 1/2015 | Staupendahl | B23K 26/0626 | 219/121.61 |
| 2015/0298253 A1 * | 10/2015 | Costin, Jr. | B23K 26/355 | 219/121.76 |
| 2015/0338718 A1 * | 11/2015 | Zhang | G02F 1/33 | 359/305 |
| 2016/0097942 A1 * | 4/2016 | Valle | G02F 1/11 | 385/27 |
| 2016/0128393 A1 * | 5/2016 | Janda | A41D 13/0051 | 219/211 |
| 2016/0139488 A1 * | 5/2016 | Nomaru | B23K 26/064 | 359/305 |
| 2018/0299745 A1 * | 10/2018 | Morse | G02F 1/113 | |

\* cited by examiner

FIXTURE TO SECURELY BOND TRANSDUCERS TO AN OPTICAL ELEMENT

This application claims priority to co-pending, commonly filed applications on Apr. 7, 2023 with Ser. Nos. 18/132,025, 18/132,034, 18/132,047, 18/132,054, 18/132,058, 18/132,064, 18/132,069, 18/132,070, 18/132,074, the contents of which are incorporated by reference.

BACKGROUND

The epoxy bonding of a transducer to an optical element is an important step in the fabrication of an acousto-optic deflector. The bond ensures that the transducer is securely attached to the surface of the optical element and can efficiently transmit the acoustic wave generated by the transducer.

If the epoxy layer is too thick, it can create several issues in the opto-acoustic deflector. Firstly, a thick layer of epoxy can cause an uneven surface, which can affect the optical properties of the deflector. This can result in distortion, scattering, or attenuation of the laser beam passing through the deflector. Secondly, a thick layer of epoxy can increase the distance between the transducer and the gold layer, which can affect the efficiency of the acousto-optic interaction. This can result in lower deflection efficiency, higher power consumption, or increased heat generation.

Additionally, a thick layer of epoxy can cause mechanical stress on the transducer and the gold layer. As the epoxy cures, it can generate heat and shrink, which can cause the transducer or the gold layer to deform or crack. This can affect the stability, reliability, and lifetime of the opto-acoustic deflector. If the epoxy layer used to bond the transducer to the optical element is too thick or uneven, it can lead to several issues such as 1) inconsistencies in acoustic coupling: The thickness and unevenness of the epoxy layer can affect the coupling of acoustic energy between the transducer and the optical element. This can result in an inconsistent deflection of the laser beam, reducing the accuracy of the system; 2) changes in frequency response: The thickness and unevenness of the epoxy layer can also impact the frequency response of the acousto-optic deflector. This can lead to distortion of the output signal and ultimately affect the quality of the beam deflection; 3) transducer damage: A thick or uneven epoxy layer can create localized areas of stress on the transducer, potentially leading to damage or failure of the transducer; and 4) decreased reliability: A thick or uneven epoxy layer can increase the risk of mechanical failure due to poor adhesion or delamination of the transducer from the optical element.

SUMMARY

In one aspect, a fixture includes a first portion receiving an optical element having a plurality of steps with at least two different step heights; and second portion adapted to be aligned with the first portion, the second portion having one or more suctions to temporarily secure the transducers to the second portion, the second portion further including one or more pistons adapted to move the temporarily secured transducers to engage corresponding steps for the transducers, wherein the one or more pistons are gimbaled to provide pressure over uneven heights during an epoxy curing process.

Implementations of the fixture can include one or more of the following. The fixture can include a bonding piston with two different piston end spacers. The fixture can include piston end plates. The fixture can include a cover plate.

In another aspect, systems and methods are disclosed for bonding a plurality of transducers to an optical element by placing each transducer on a moveable pedestal mounted on a piston; temporarily securing each transducer to the moveable pedestal; applying an epoxy to a plurality of steps on a deflector surface; placing the piston with the transducers over the plurality of steps; actuating the piston and moving each moveable pedestal to contact the transducer with the epoxy; releasing the transducer from the moveable pedestal; and curing the epoxy to secure the transducer to the steps.

Implementations can include one or more of the following. The method includes aligning the moveable pedestals over the deflector. The temporary securing of each transducer includes suctioning the transducer to the moveable pedestal, which is piston operated. The method gimbals, or moves the piston laterally and longitudinally, to apply a layer of a predetermined thickness to secure the transducer to the epoxy. The method can apply a pneumatic actuation to move each moveable pedestal towards a corresponding step. The gimbaling of the moveable pedestals in an X direction and a Y direction results in applying appropriate pressure to provide a thin layer of epoxy to bind the transducer to the optical element. The temporary air suction hose to secure the transducers can be removed prior to curing the epoxy. Excess epoxy around the transducer can be trimmed after curing. The method includes electrically coupling one side of the transducer to ground and a second side to an impedance matching circuit. For example, the method electrically connects the transducer to a tuning circuit to match a predetermined impedance.

Advantages may include one or more of the following. The method improves the quality of the epoxy bond, which is critical to the performance of the acousto-optic deflector. The bond is strong enough to withstand the stresses of the acoustic wave, but not too thick as it may dampen the acoustic wave or reduce the efficiency of the device. Proper bonding ensures that the acousto-optic deflector operates efficiently and reliably.

DESCRIPTION

The epoxy bond of a transducer to an optical element is a crucial step in the fabrication of an acousto-optic deflector. The bond ensures that the transducer is securely attached to the surface of the optical element and can efficiently transmit the acoustic wave generated by the transducer.

Figure 1:
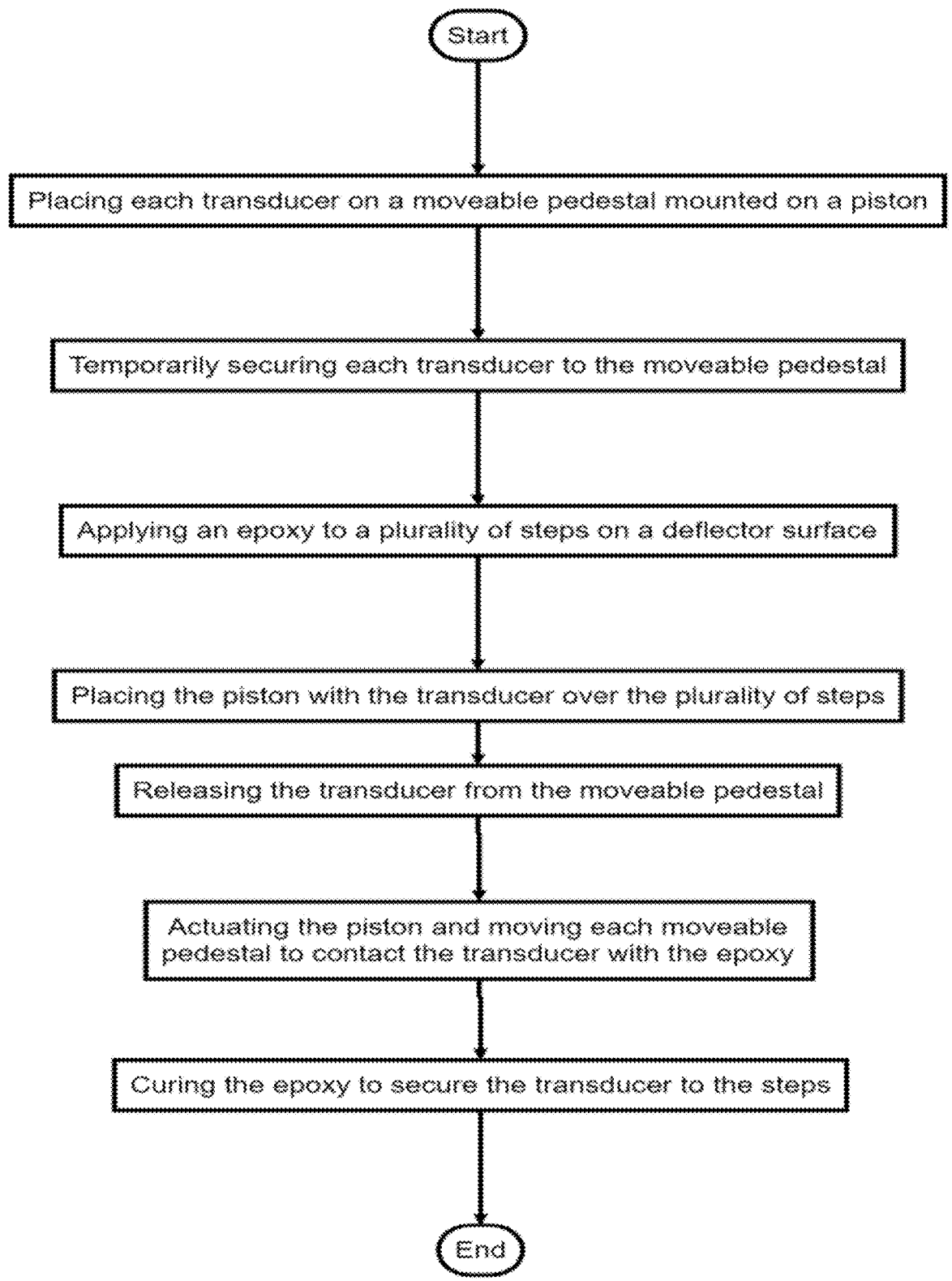
FIG. 1 shows an exemplary process to bond a set of transducers to a phase-array deflector.

FIG. 1 shows an exemplary process to bond a plurality of transducers to an optical element at different heights on the optical element. The process includes:

placing each transducer on a moveable pedestal mounted on a piston;

temporarily securing each transducer to the moveable pedestal;

applying an epoxy to a plurality of steps on a deflector surface;

placing the piston with the transducers over the plurality of steps;

actuating the piston and moving each moveable pedestal to contact the transducer with the epoxy;

curing the epoxy to secure the transducer to the steps; and releasing the transducer from the moveable pedestal.

Figure 2:
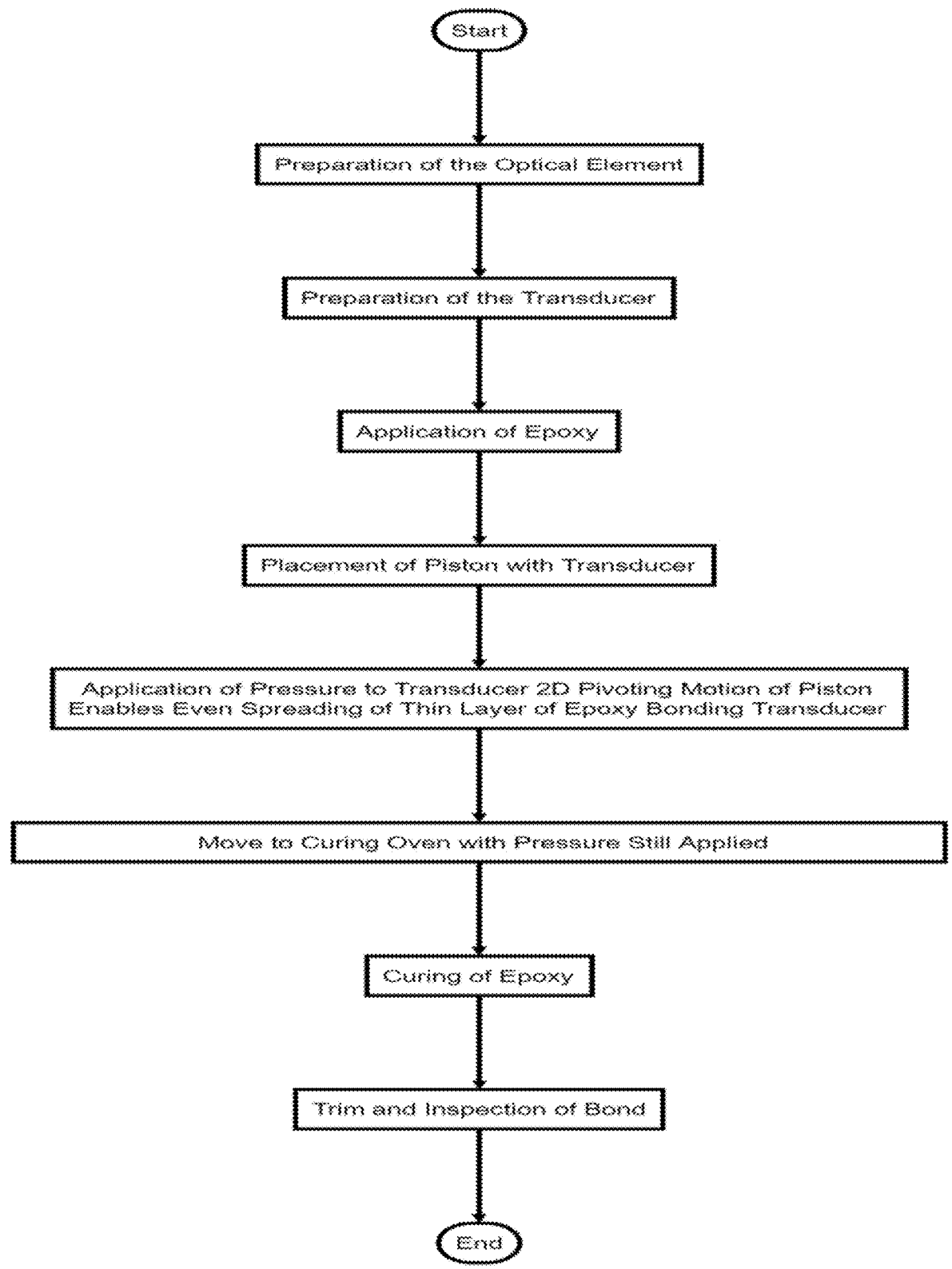
FIG. 2 shows another exemplary process to bond a set of transducers to a phase-array deflector.

FIG. 2 shows another process for the epoxy bond process:

Preparation of the Optical Element: The surface of the optical element is cleaned and polished to ensure there are no impurities or scratches that could affect the bond quality.

Preparation of the Transducer: The transducer is cleaned and inspected to ensure it is free of defects or cracks. The transducer is then placed on a moveable pedestal that is mounted on a piston.

Application of Epoxy: A small amount of epoxy is applied to a specific area of the surface of the optical element. The exact location depends on the specific design of the acousto-optic deflector.

Placement of Piston with Transducer: The piston with the transducer is positioned over the area where the epoxy was applied. The piston is typically designed as a gimbal that can move in the X and Y directions to apply controlled pressure to the transducer.

Application of Pressure: The piston is actuated, and each moveable pedestal moves to contact the transducer with the epoxy. The applied pressure spreads the epoxy evenly between the transducer and the surface of the optical element, ensuring a strong bond.

Curing of Epoxy: The epoxy is allowed to cure at room temperature for several hours, or it may be cured at an elevated temperature, depending on the specific epoxy used.

Excess Epoxy Trim and Inspection of Bond: After the epoxy is cured, the bond between the transducer and the optical element is inspected for any defects or weaknesses.

The method for securing transducers to a gold-plated optical element using epoxy involves the following:

Placing each transducer on a moveable pedestal mounted on a piston: The crystals are carefully placed on a moveable pedestal which is mounted on a piston that is capable of moving up and down.

Temporarily securing each crystal to the moveable pedestal: To prevent the crystals from falling off during the assembly process, they are temporarily secured to the moveable pedestal using vacuum to hold the transducer to the piston.

Applying an epoxy to a plurality of steps on a deflector surface: A small amount of epoxy is applied to a plurality of steps on the deflector surface. It is important to apply the epoxy thinly and evenly to avoid any inconsistencies in the final assembly.

Placing the piston with the crystals over the plurality of steps: The piston, with the crystals mounted on the moveable pedestals, is carefully lowered using air line 170 over the plurality of steps on the deflector surface.

Actuating the piston and moving each moveable pedestal to contact the crystal with the epoxy: The piston is actuated to move each moveable pedestal, and the crystals are brought into contact with the epoxy on the steps of the deflector surface.

Curing the epoxy to secure the crystal to the steps: Once the crystals are in place, the epoxy is cured. This is typically done by heating the assembly to a specific temperature for a specified amount of time. The curing process ensures that the crystals are securely attached to the deflector surface.

In one embodiment, during the curing, the air pressure is maintained to push the piston with the transducer(s) to the epoxy. Vacuum through inlet 172 holds the transducers to the piston. The assembly with air pressure is then put into a curing oven and when complete, the air pressure is then released after the curing is complete.

It is important to note that the entire assembly process should be carried out in a clean environment, free of dust and other contaminants, to avoid any potential issues with the final product. Additionally, care should be taken to ensure that the crystals are properly aligned with the deflector surface to avoid any misalignment issues during use.

Due to the steps with variable heights, the piston is a gimbal that can move in x and y axis to apply controlled pressure to the crystals and to spread the epoxy as thin as possible. The use of a gimbal allows for precise movement of the piston in both the x and y directions, which helps to ensure that each crystal is pressed evenly onto the deflector surface even where different step heights are involved, and that the epoxy is spread evenly across the steps. This is important for achieving a strong and reliable bond between the crystals and the deflector surface, as well as for ensuring that the crystal positions are aligned correctly. The gimbal can also be used to adjust the pressure and angle of the crystals, which can be important for optimizing the performance of the opto-acoustic deflector.

The method improves the quality of the epoxy bond, which is critical to the performance of the acousto-optic deflector. The bond is strong enough to withstand the stresses of the acoustic wave, but not too thick as it may dampen the acoustic wave or reduce the efficiency of the device. Proper bonding ensures that the acousto-optic deflector operates efficiently and reliably.

FIGS. 3A-3D show an exemplary fixture to bond the transducers. The fixture includes a base portion 100 and a top portion 150 with a moveable pedestal 110 secured by screws 154. The base portion 100 receives an optical element 10 with the steps that change the height of the transducers relative to each other once mounted to the optical element 10. The two portions 100 and 150 have alignment holes 103 and 152 to allow the two portions to be flexibly secured to each other via pins through the hole. Yet the two portions 100 and 150 can move in the X-Y directions (gimbal) so that the two portions can best fit the changing heights of the steps. The top portion 150 has a plurality of pedestals 110 each receiving a transducer and the back of each pedestal has one or more small opening 112 that is connected to an air line connected to a vacuum hose and when air suction is applied, the small openings 112 suck the transducers into the pedestals and temporarily secure the transducers in place during the epoxy curing process. The transducers are held in place and epoxy is applied to the step on the optical element 10, and then the top/bottom portions 100 and 150 are then secured against each other via pins 102. When secured with the pins, the top and bottom portions can still pivot slightly in the X-Y axis and act as a gimbal to securely apply pressure even with the steps on the top of the optical element. Pneumatic power is applied to move the pistons toward the steps on the optical element 10 of assembly 30 and after this point, the air suction tube can be disconnected and the fixture with the pneumatic line is moved to a curing oven to cure the epoxy.

In one embodiment, a T-shaped piston is used which has an opening to receive air via channel 104 to drive the piston to clamp the transducer against the step. As shown in FIG.

Figure 3A:
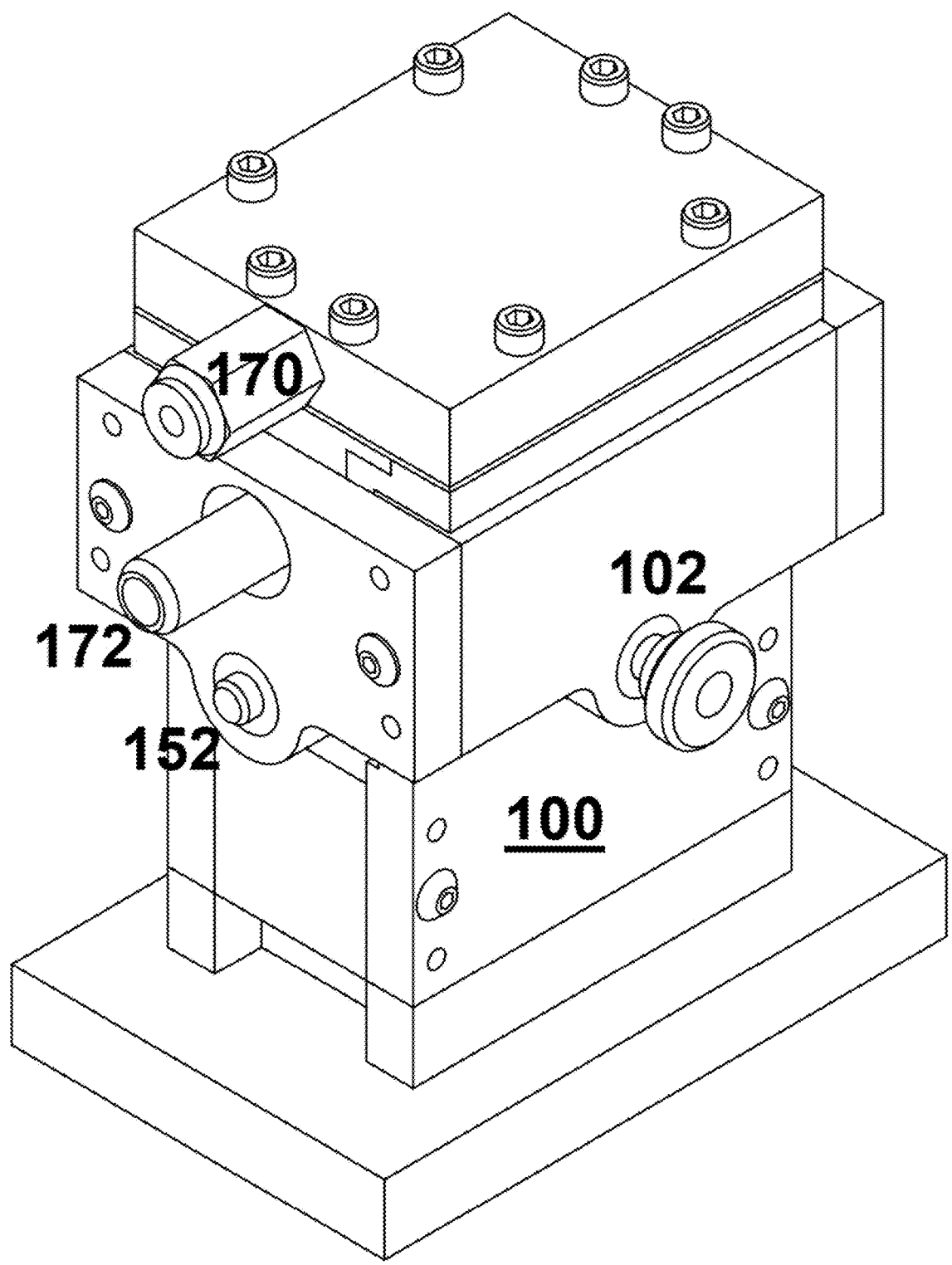
FIGS. 3A-3D show an exemplary fixture to bond the transducers.
Figure 3B:
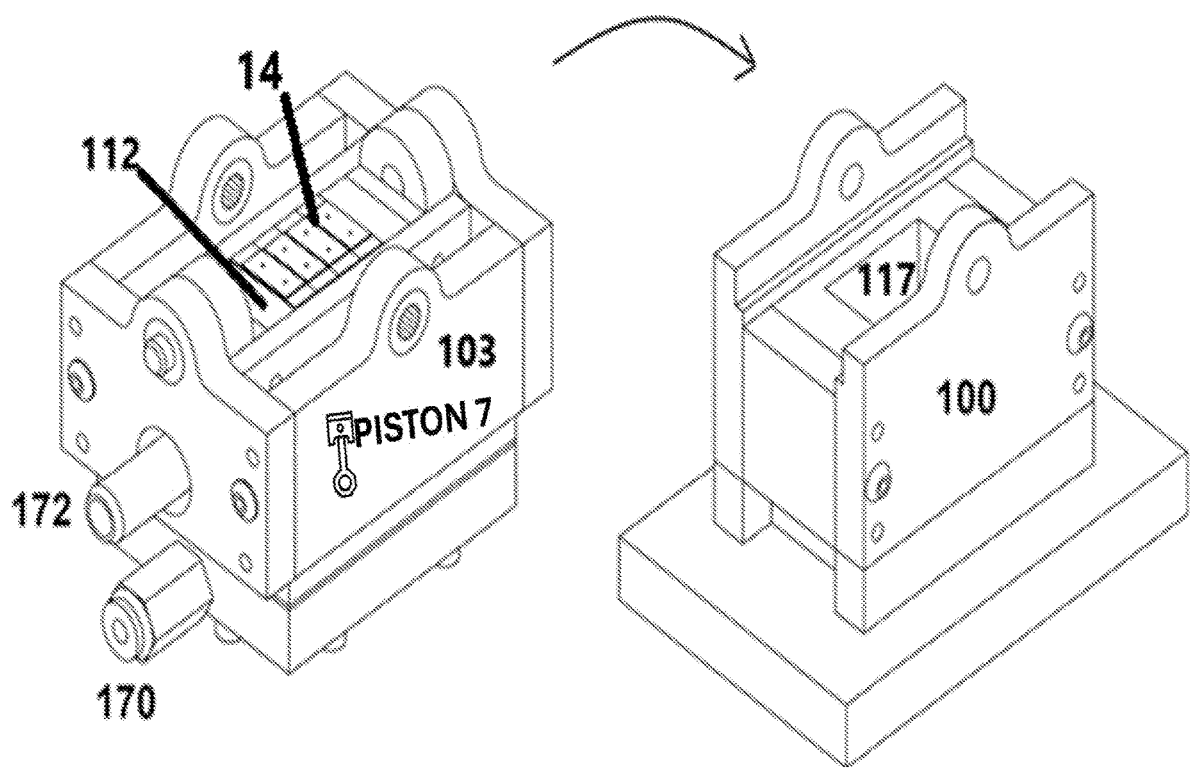
Figure 3C:
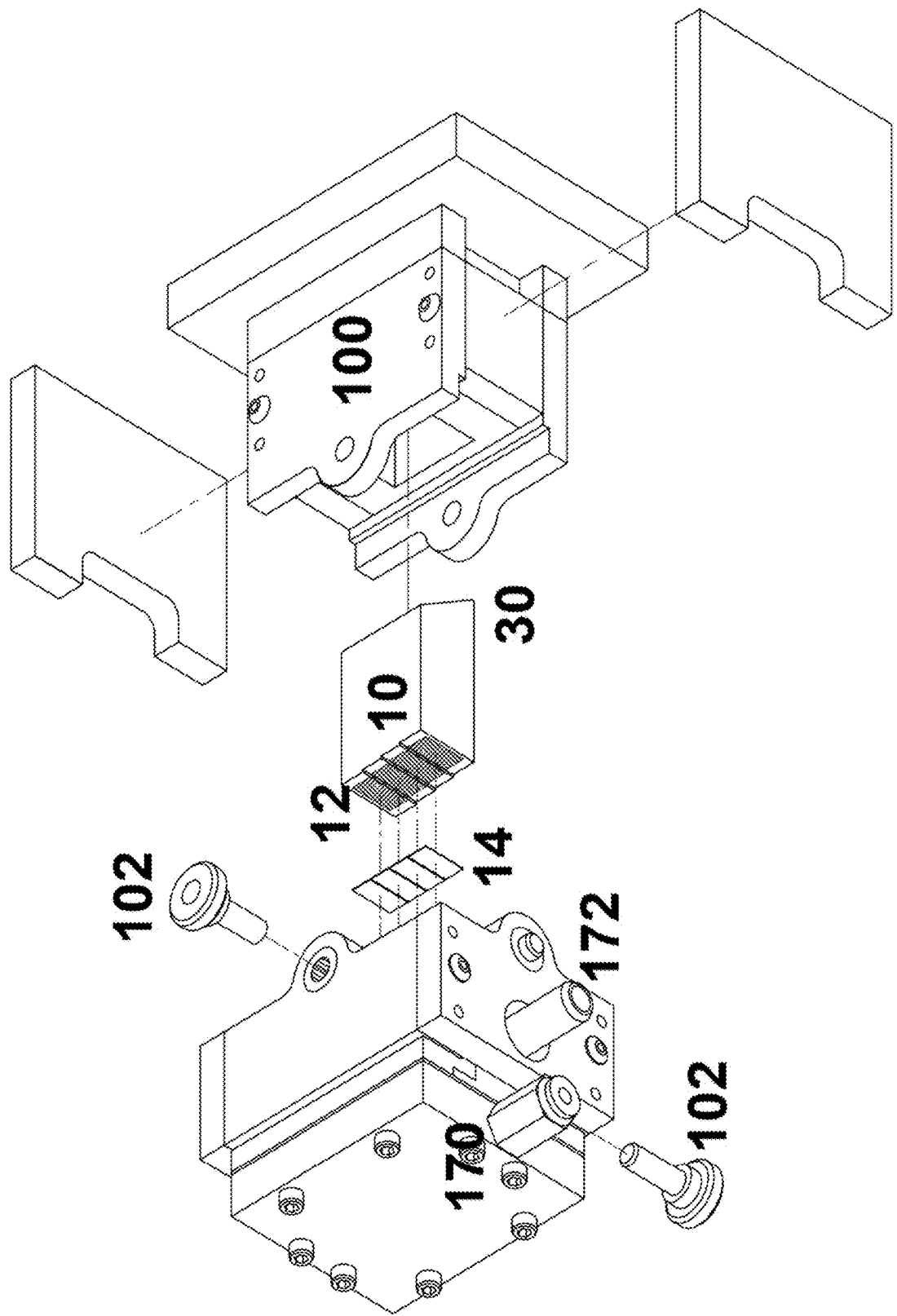
Figure 3D:
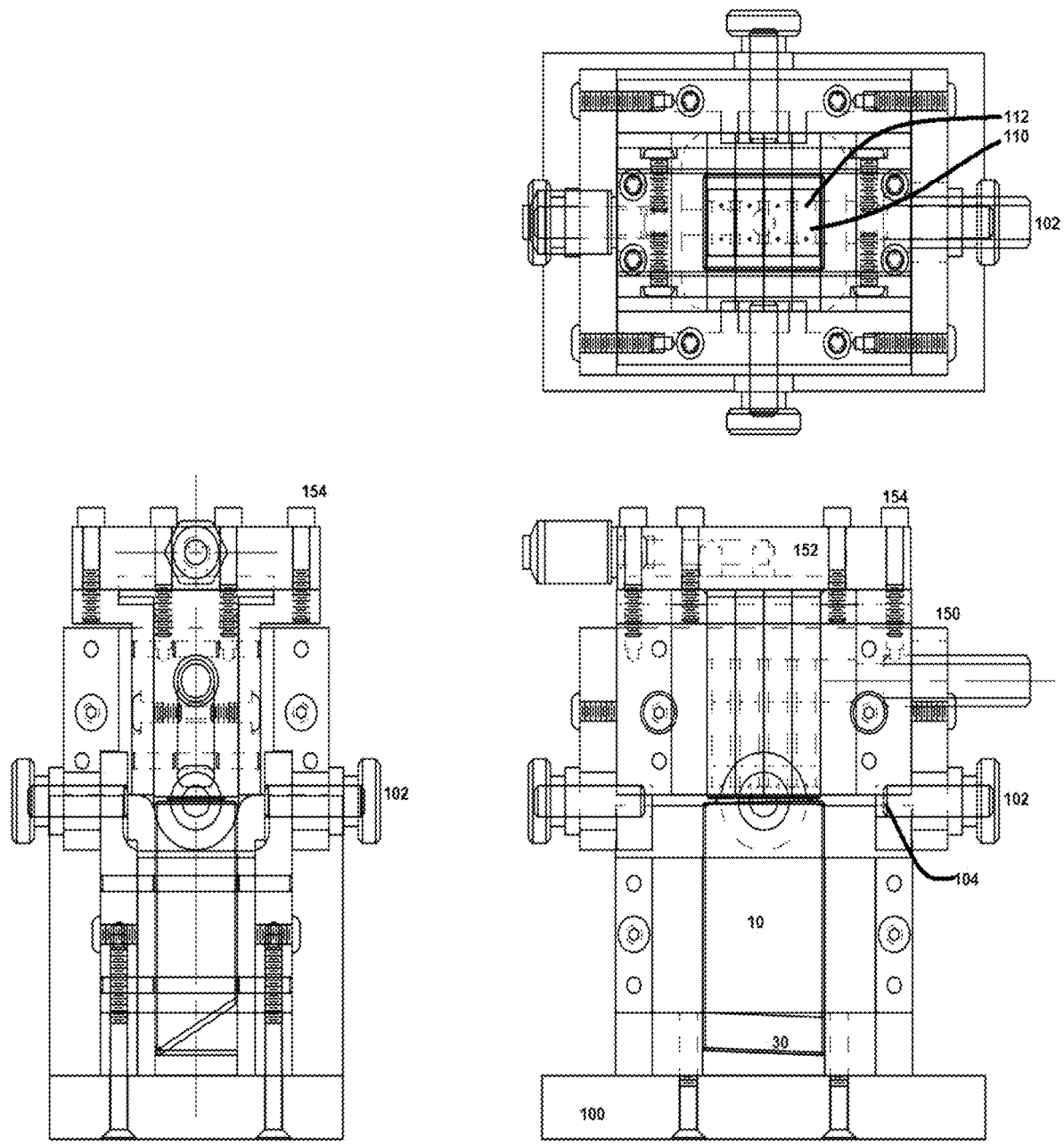

3B, the fixture has two piston end spacers, wherein a first piston end spacer has an opening to receive air on one side and a second piston end spacer is planar (without the opening) on an opposite side of the first piston end spacer. FIG. 3D shows two piston end plates, wherein a first piston housing end plate includes a U-shaped bottom and a T-shaped top. A second piston housing end plate also has a U-shaped bottom and, includes a T-shaped top and an opening for air. A side plate is used which is rectangular shaped with two openings to receive pins that secure the first portion with the second portion.

An air suction inlet is connected to the second portion to vacuum air away from one or more pins on a transducer receiving pad to temporarily secure the transducers. A pneumatic pump is connected to a pneumatic input of the second portion to drive the piston to and from the steps of the optical element mounted on the first portion. An epoxy dispenser can be used to provide epoxy on the steps.

Figure 4A:
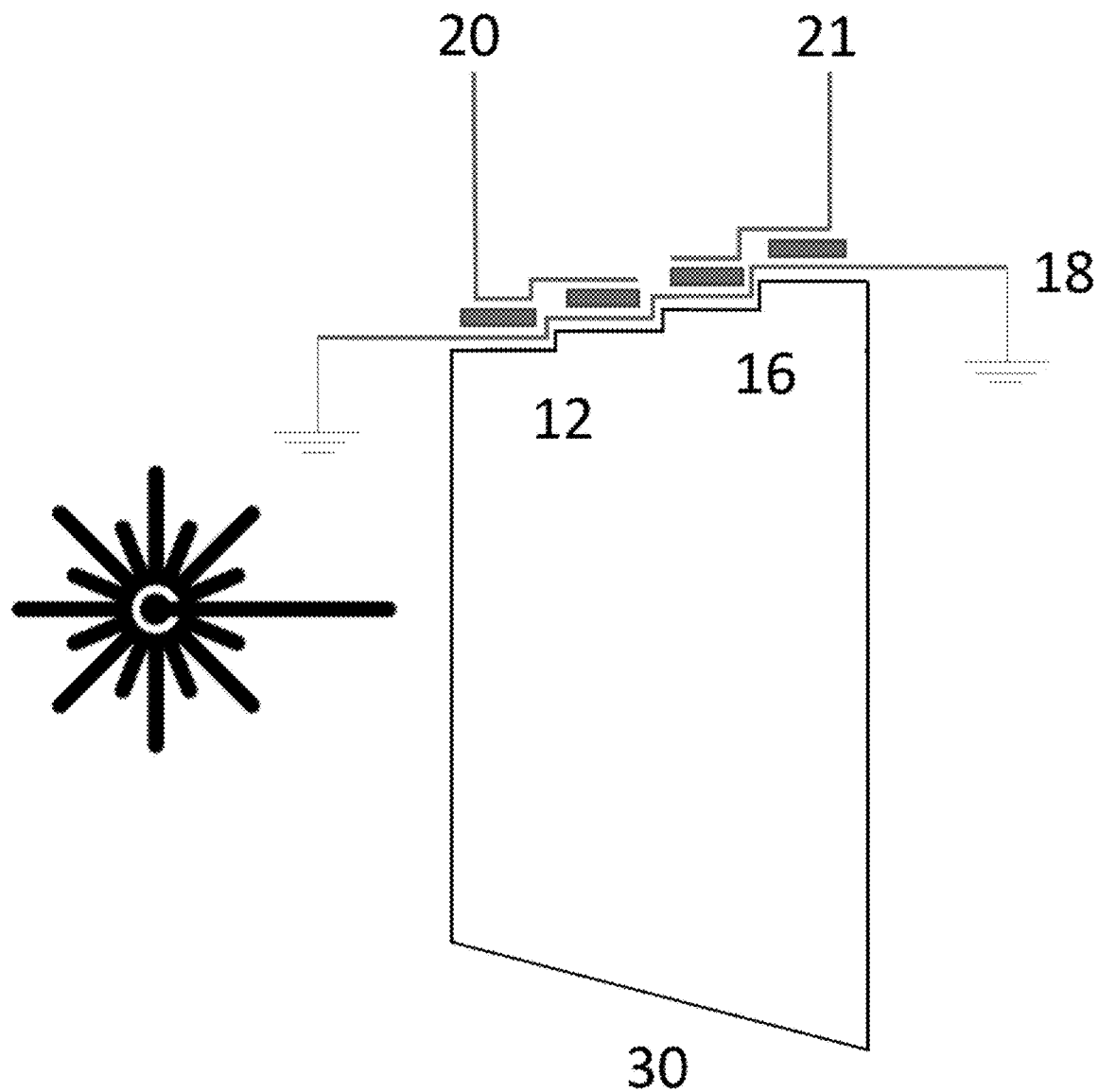
FIG. 4A-4C show an exemplary phased array opto-acoustic deflector.

FIG. 4A shows an exemplary assembly 30 having an optical element 10 with transducers 13 or crystals 14 that are bonded to the optical element with as thin a layer of epoxy as possible to improve transducer performance. The phase-array device of FIG. 4 includes optical element 10 having a surface with one or more steps 12, 16 formed thereon, where the optical element 10 has at least two step heights. A ground connection 18 is provided on one side of the transducers 13 or crystals 14, while signal lines 20 and 21 are connected to the other side of transducers 13 or crystals 14. The different heights of the steps affect the acousto-optic RF frequency response(s). In these applications, the optical element is made of a material that can support a propagating acoustic wave, such as a crystal or glass. The acoustic wave is created by a transducer, and its frequency is modulated by an applied RF signal. The optical element is made of a material that can support a propagating acoustic wave, such as a crystal or glass. The acoustic wave is created by a transducer, and its frequency is modulated by an applied RF signal. the height of each step affects the acousto-optic RF frequency response, is typically used in acousto-optic modulators and deflectors.

Figure 4B:
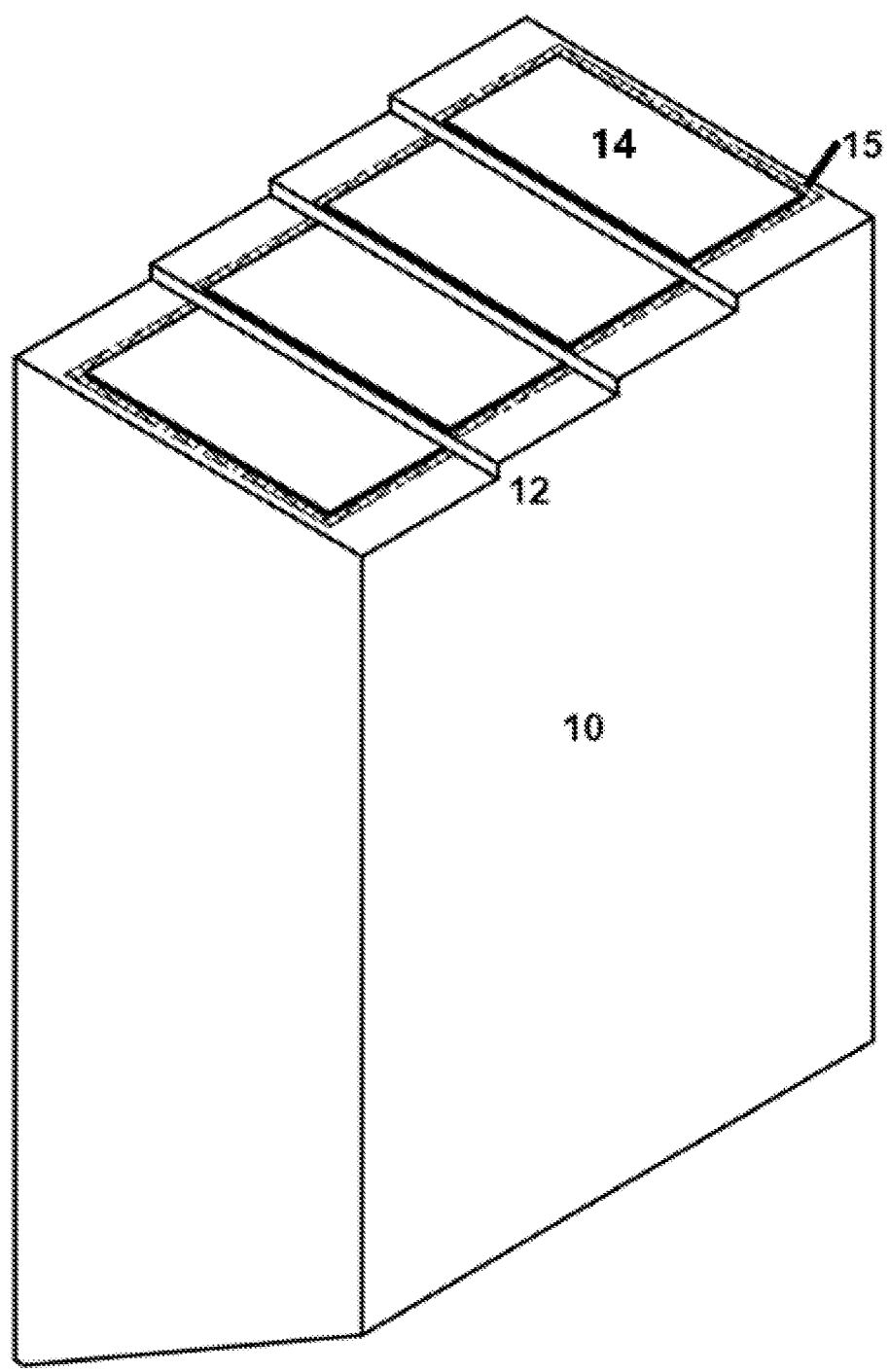
Figure 4C:
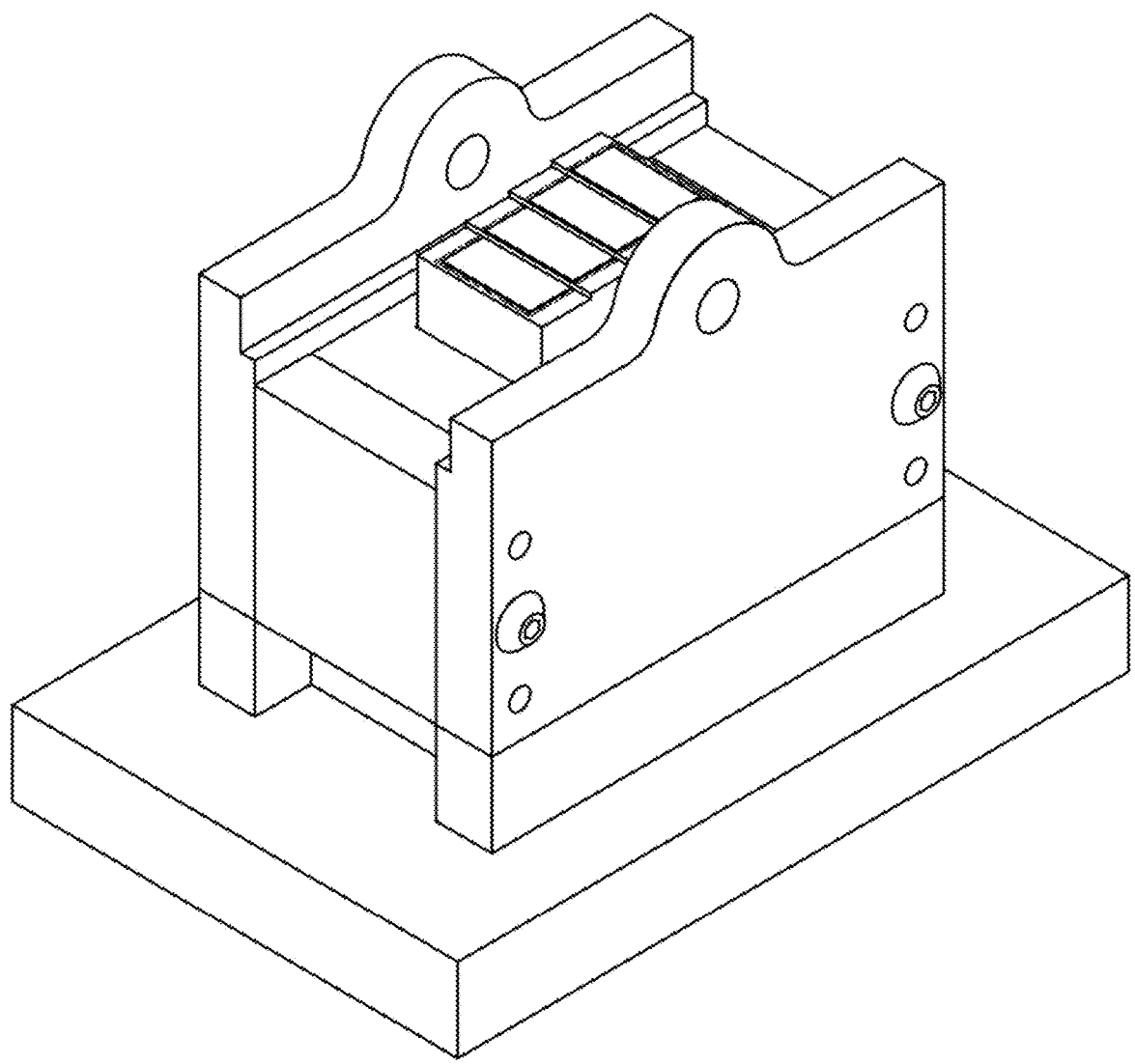

As shown in FIG. 4B, the optical element 10 has a surface with one or more steps 12 formed thereon, where the height of each step on the surface of the optical element can be precisely controlled during the manufacturing process, which allows for the creation of specific acousto-optic frequency responses. The step height can be chosen to match the wavelength of RF input, creating a specific phase shift, or to provide a specific diffraction angle. The height of each step can also affect the coupling between the acoustic wave and the optical wave, which determines the efficiency and bandwidth of the acousto-optic interaction. Grinding or subtractive techniques can be applied to the surface of the optical element to form one or more steps spaced apart on the surface, where the height of each step affects the acousto-optic RF frequency response. This provides a versatile and precise tool for manipulating the interaction between acoustic waves and optical waves. This technology is useful in a variety of applications, such as laser beam modulation, scanning, and frequency shifting.

In some cases, the steps 12 on the surface of the optical element can have a plurality of different heights. This can be done to create a more complex RF frequency response, which can be useful for certain applications. Transducer 13 is adhesively bonded with a thin epoxy layer 15 to the top to steps 12. This is done when the device 10 is inserted into its spot in the receptacle of FIG. 4C, applying a thin layer of epoxy 15 on top of step 12, and then by operation of vacuuming the transducer 13 to secure it to the bottom of the piston and by air pressure lowering the piston with the top of step 12 and evenly apply the epoxy to secure the transducer 13 to device 10.

By having steps with different heights, the acousto-optic device can be designed to deflect light at multiple angles or frequencies. This can be used, for example, in laser scanning systems, where the deflection angle of the incident laser beam needs to be precisely controlled.

It is explicitly stated that all features disclosed in the description and/or the claims are intended to be disclosed separately and independently from each other for the purpose of original disclosure as well as for the purpose of restricting the claimed invention independently of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

In the context of optics and telecommunications, modulation refers to the process of intentionally modifying a signal (e.g., light) by varying one or more of its properties, such as amplitude, frequency, or phase. This can be used for a variety of purposes, including deflection and shifting of the signal. For example, in acousto-optic modulation, a signal is deflected or shifted by using an AOD to apply a varying acoustic wave to a crystal, which in turn alters the refractive index and deflects or shifts the light passing through it. Similarly, in electro-optic modulation, a voltage is applied to a crystal to change its refractive index and modulate the light passing through it. These types of modulation can be used in a variety of applications, such as telecommunications, signal processing, and laser machining.

A number of embodiments of the invention have been described. Nevertheless, it will be understood that various modifications may be made without departing from the spirit and scope of the invention. Accordingly, other embodiments are within the scope of the following claims.

What is claimed is:

1. A method for bonding a plurality of transducers to an optical element, comprising:
   placing each transducer on a moveable pedestal coupled to a piston;
   temporarily securing said each transducer to the moveable pedestal;
   applying an epoxy to a plurality of steps on the optical element a deflector surface;
   placing the piston with the transducers over the plurality of steps;
   actuating the piston and moving the moveable pedestal with the transducer to contact the transducer with the epoxy;
   releasing the transducer from the moveable pedestal; and
   curing the epoxy to secure the transducer to the steps.

2. The method of claim 1, comprising aligning the moveable pedestals over the deflector.

3. The method of claim 1, wherein the temporarily securing each transducer comprises suctioning the transducer to the moveable pedestal.

4. The method of claim 1, comprising moving the piston laterally and longitudinally to apply an epoxy layer of a predetermined thickness to secure the transducer.

5. The method of claim 1, wherein the actuating comprises applying a pneumatic actuation to move each moveable pedestal towards a corresponding step.

6. The method of claim 1, comprising gimbaling the moveable pedestal to apply pressure to the transducer and the epoxy.

7. The method of claim 1, comprising trimming excess epoxy around the transducer after curing.

8. The method of claim 1, comprising electrically coupling one side of the transducer to ground and a second side to an impedance matching circuit.

9. The method of claim 1, comprising electrically coupling the transducer to a tuning circuit to match a predetermined impedance.

\* \* \* \* \*